Dec. 13, 1955   A. MAAG   2,726,856
CUPOLA AND A COMBINED FUEL AND AIR SUPPLY DEVICE THEREFOR
Filed March 24, 1953   2 Sheets-Sheet 1
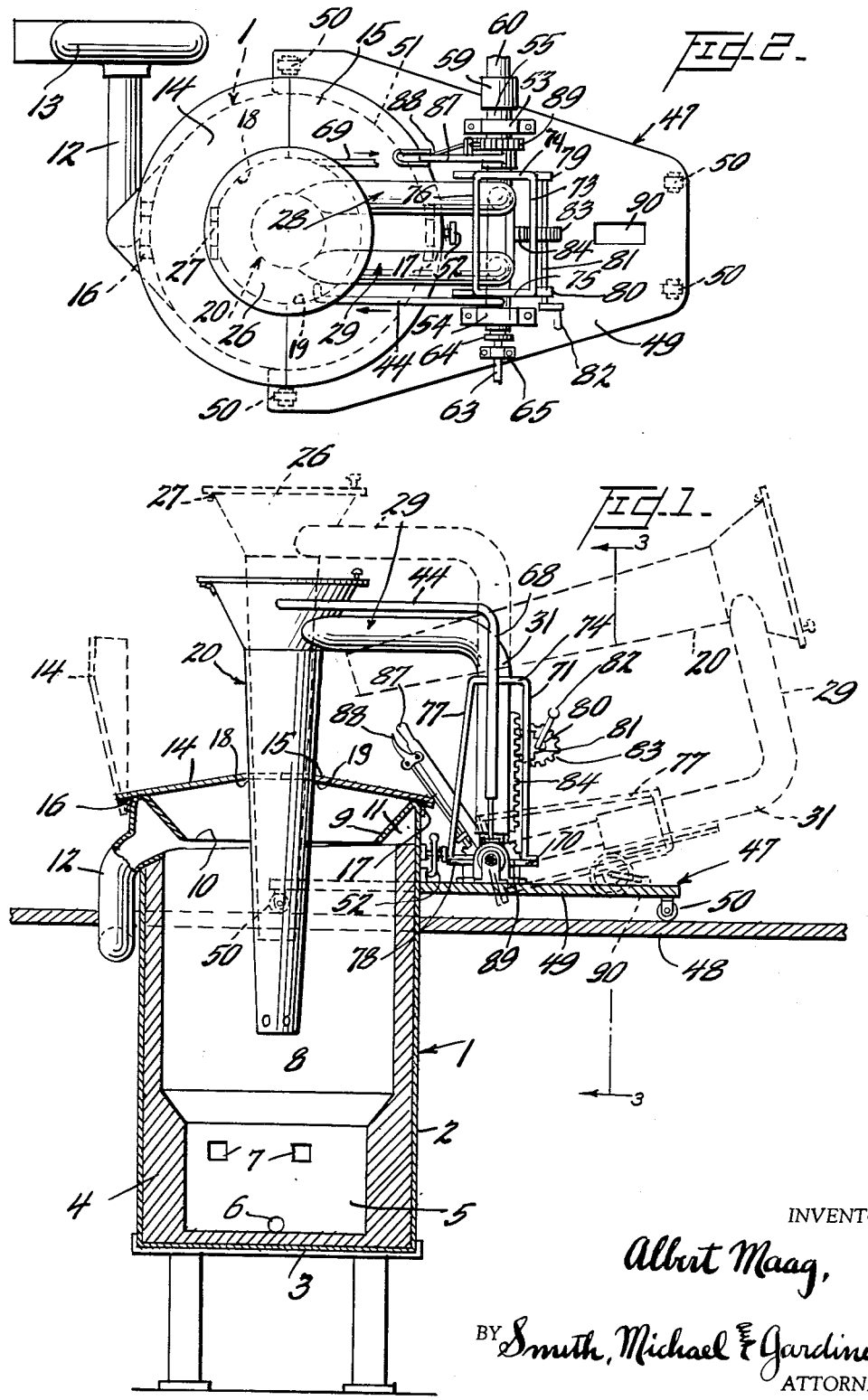
INVENTOR:-
Albert Maag,
BY Smith, Michael & Gardiner,
ATTORNEYS

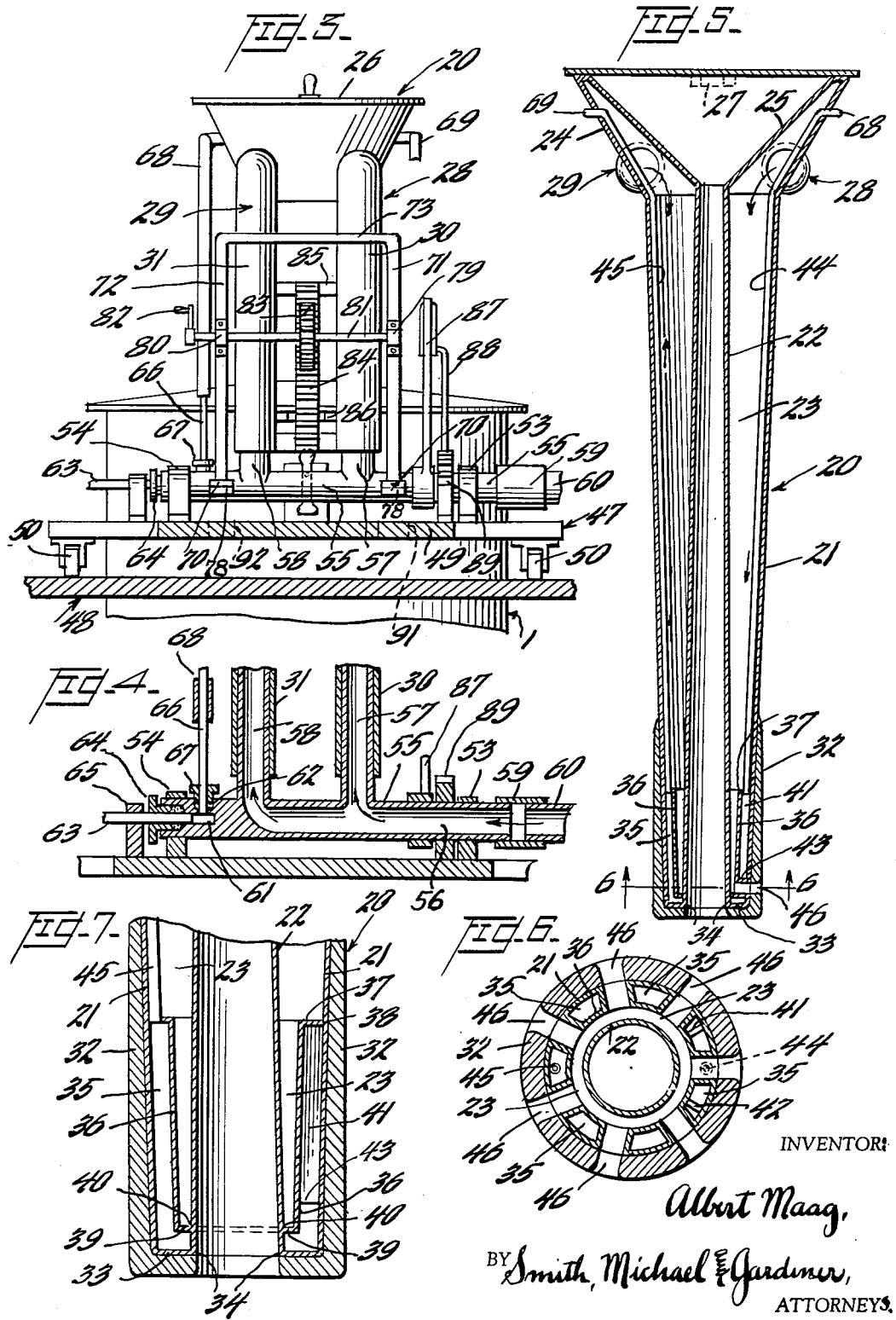

United States Patent Office 2,726,856
Patented Dec. 13, 1955

2,726,856

CUPOLA AND A COMBINED FUEL AND AIR SUPPLY DEVICE THEREFOR

Albert Maag, Liege, Belgium

Application March 24, 1953, Serial No. 344,283

9 Claims. (Cl. 266—27)

My present invention relates to improvements in cupolas primarily designed for the melting of various ferrous and non-ferrous metals, alloyed metals, ores, minerals, chemicals, and the like, by the combustion of coke, coal, charcoal, or other carbonaceous fuel, and has particular reference to a novel and efficient combined fuel feeding and air supply device having means associated therewith for adjusting said device vertically within the cupola and for effecting ready removal of such device from its normal vertical position within the cupola.

In cupolas of the general type to which the present invention relates, it has been previously proposed, as evidenced by patents granted on such cupolas, to provide a vertical, centrally positioned, combined fuel feeding and air supply device which is surrounded by the material being melted to supply fuel and air to the melting zone of the cupola. Such prior art devices have their lower or discharge end positioned at a fixed level within the cupola, and no means are provided for adjusting the device vertically within the cupola to vary or control the position of the lower or discharge end of such device or for readily removing such device from the cupola when such removal becomes necessary following the completion of the melting operation or of a series of such operations, or when it becomes necessary to remove such device from the cupola to permit cleaning or repair of the interior of the cupola, or for the purpose of replacement or repair of the combined fuel feeding and air supply device. The combined fuel feeding and air supply devices of the prior art have not been constructed in a manner such as to withstand for more than a relatively short time, the intense heat within or adjacent the melting zone of the cupola and the lower or discharge ends of such devices burn away following the completion of relatively few melting operations, thus destroying the effective feed of the fuel and air to the melting zone and necessitating frequent repair and replacement of such devices. The development of the present invention has proceeded from a knowledge of the deficiencies and difficulties of the devices of the prior art and with a view to providing a combined fuel feeding and air supply device which is devoid of such deficiencies and difficulties, and which is highly effective and efficient for the purposes for which designed.

It is an object of my present invention to provide a cupola having therein a combined fuel feeding and air supply device disposed vertically within the cupola and adapted to be surrounded by the ore, minerals, chemicals, or the like to be melted within said cupola, and to associate with said device means for vertically adjusting the same so as to position the lower or discharge end of the device at the level best suited for the burning of the particular carbonaceous fuel employed and/or for the melting of the particular material within the cupola.

It is a further object of my present invention to provide a cupola having therein a combined fuel feeding and air supply device disposed vertically and centrally therein and to associate with said device means by which the same may be vertically adjusted within the cupola to vary the position of the lower or discharge end of said device with respect to the melting zone within the cupola, and by which said device may be readily removed from its normal vertical position within the cupola to a substantially horizontal position exteriorly of said cupola upon the completion of the melting operation or a series of such operations, or when it becomes necessary to remove the device from the cupola to permit cleaning or repair of the interior of the cupola or replacement or repair of the device or parts thereof.

It is a further object of my present invention to provide a novel combined fuel feeding and air supply device adapted for use within a cupola, which device includes an elongated inner chamber into which the selected fuel is fed and from the lower end of which the fuel is fed to the melting zone of the cupola, and an elongated outer chamber surrounding said central chamber and defined by the outer wall thereof and an outer wall spaced from said outer wall of said central chamber, the space between said two walls constituting the air supply means for feeding air to the lower end of said outer chamber and into the melting zone of the cupola and also defining a space in which pipes may be mounted for supplying a cooling fluid to the lower or tip end of the device to reduce the temperature of said end when said end is positioned within or closely adjacent the melting zone within the cupola.

It is a further object of my present invention to provide a combined fuel feeding and air supply device of the character above described in which the lower or discharge end of said device is adequately protected by refractory material and by fluid cooling means so as to withstand for an appreciable period of time the relatively high temperatures existing in or adjacent the melting zone within the cupola.

It is a still further object of my present invention to provide a cupola and a combined fuel feeding and air supply device therefor that is relatively simple in construction and operation, that is relatively cheap and easy to manufacture, that is strong and durable, and which is highly efficient for the purposes for which designed.

In the accompanying drawings, wherein for the purpose of illustration I have shown a preferred embodiment of my present invention, Fig. 1 is a vertical view, partly in section, of a cupola showing my improved combined fuel feeding and air supply device and its associated mechanisms, various portions of said device and mechanisms being shown in full and in dotted lines, Fig. 2 is a plan view of the cupola and of the combined fuel feeding and air supply device and its associated mechanisms, shown in Fig. 1, Fig. 3 is a vertical sectional view on the line 3—3 of Fig. 1, Fig. 4 is a fragmentary, vertical sectional view of the lowermost portion of Fig. 3, Fig. 5 is a vertical sectional view of the combined fuel feeding and air supply device of my present invention, Fig. 6 is a transverse, sectional view on the line 6—6 of Fig. 5, and Fig. 7 is an enlarged, fragmentary, vertical sectional view of the lower end portion of the combined fuel feeding and air supply device of my present invention.

Referring to the accompanying drawings, wherein like reference numerals have been employed to designate like parts throughout the several views, the numeral 1 designates, broadly, a cupola or vertical furnace primarily adapted for use in the melting of ferrous or non-ferrous metals, alloys of metals, ores, minerals, chemicals, or the like by the combustion of coke, coal, charcoal, or other carbonaceous fuel. This cupola 1 preferably comprises an outer metallic shell 2, which shell is closed at its bottom 3 and has its inner walls lined or covered with a relatively thick layer or body of refractory material 4, it being noted (see Fig. 1) that the refractory layer or body 4 at the lower region 5 of the cupola is considerably thicker than the remainder of the said refractory, to provide a chamber portion of reduced diameter within the said lower region 5. The lower region 5 of the cupola is provided with the usual slag spout (not shown) spaced upwardly from the bottom 3 of the cupola and with a main outlet tap or discharge opening 6 positioned at a level below that of the said slag spout and preferably near the bottom 3 of the cupola. Suitable blast orifices or tuyeres 7 of any desired or preferred construction are provided for supplying a controlled blast or blasts of air to the lower portion of the cupola. The actual melting zone of the cupola exists in an area slightly above the plane of the blast orifices or tuyeres 7 and is designated by reference numeral 8. Suitable observation or "peep" openings (not shown) may be provided through the metallic shell 2 and its refractory lining 4, through which openings conditions existing within the cupola may be readily observed.

At the upper end of the cupola the metallic shell 2 extends above the uppermost edge of the refractory lining 4 and has attached thereto, as by welding, a downwardly- and inwardly-inclined skirt portion 9, the under surface of which may, if desired, be coated or lined with suitable refractory material. As will be readily apparent from Fig. 1 of the accompanying drawings, the inner diameter of the depending, inwardly-inclined skirt portion 9 is less than the internal diameter of the inside of the cupola as defined by the refractory lining 4 at the upper end of the cupola, by virtue of which construction, said skirt portion forms an inwardly projecting lip or annular edge 10 which projects into the body of the cupola and serves to form an interceptor for the gases and products of combustion rising from the lower to the upper regions of the cupola. Gases and products of combustion which are intercepted by the overhanging inner edge 10 of skirt portion 9 enter an annular chamber 11 formed by the upper edge of the outer metallic shell 2 and the said depending skirt portion 9. As an effective means for exhausting the gases and products of combustion from the said annular chamber, I connect an outlet pipe 12 at one side of the cupola, the outer end of which pipe is connected to the intake of an exhaust fan 13 which draws the gases and products of combustion from the said annular chamber and conveys the same to a suitable stack (not shown). The upper end of cupola 1 is normally closed by a pair of semicircular lid or closure members 14 and 15 pivotally mounted, as at 16 and 17, respectively, to the upper end portion of metallic shell 2 of the cupola. The lid or closure members 14 and 15 are provided along their straight, diametrical edges with semicircular openings 18 and 19 which are located at the central portion of said edges and which cooperate, when the lid or closure members are in their normally closed positions, to provide a circular opening for a purpose to be hereinafter described.

The combined fuel feeding and air supply device which constitutes an important feature of my present invention and which is susceptible of use with numerous and sundry types of cupolas or vertical shaft type furnaces, is designated, broadly, by the reference numeral 20, and includes an outer cylindrical shell 21 and an inner cylindrical shell 22 spaced from the shell 21 to provide therebetween an annular air space 23, each of the shells 21 and 22 terminating at their upper ends in enlarged, outwardly and upwardly tapered or funnel-like portions 24 and 25, with the upper, rim-like edge of the funnel-like portion 25 secured, as by welding, to the upper rim-like edge of funnel-like portion 24 to constitute the upper wall of air space 23, all as best shown in Fig. 5. As a means for closing the top of the combined fuel feeding and storing device 20, I provide a cover 26 pivoted at 27 and adapted to be swung about its pivotal mounting to an open position to permit the introduction of carbonaceous fuel to the interior of the inner cylindrical shell 22, from the lower end of which shell the fuel is fed to the melting zone of the cupola within which such device is inserted. If desired, the inner shell 22 may be downwardly and outwardly inclined, as best shown in Fig. 5, to insure a more ready downward flow of the fuel from the upper portion thereof to the lower or discharge end thereof. Also, if desired, the outer shell 21 may be downwardly and inwardly inclined, as best shown in Fig. 5, such formation of said outer shell facilitating removal and insertion of the device from and into the cupola. The air space 23 is connected to a pair of air supply pipes 28 and 29 secured, as by welding, to the outer surface of funnel-like portion 24 of the outer shell 21, these pipes 28 and 29 extending radially from portion 24 and having their outer ends 30 and 31 turned downwardly from a horizontal position as best shown in Figs. 1, 2, and 3, for a purpose to be hereinafter described, these pipes 28 and 29 serving as supports for the combined fuel feeding and air supply device 20.

Since the lower or discharge end of the device 20 is normally within the melting zone 8 of the cupola and is subjected to the high temperatures normally existing within said zone, I provide means for protecting said lower or discharge end and for preventing the burning away of the lower end of the outer metallic shell 21. To effect such protection, I cover the lower portion of the outer metallic shell 21 with a layer of highly refractory material 32, which material completely covers the outer surface of the lower portion of said outer shell and extends inwardly beneath the inturned flange 33 of the outer shell 21, which flange is welded at 34 to the lower end of the inner shell 22, as best shown in Figs. 5 and 7. The protection afforded by the refractory cover 32 is sufficient in some melting operations where relatively high temperatures are not encountered, and where the control of the air blasts and air supply are such that a melting zone of intense temperature is not developed within the cupola, the ultimate temperatures being dependent, of course, upon the fuel employed and the character of the material undergoing treatment.

As a further means of protecting the lower or discharge end of the combined fuel feeding and air supply device 20, I provide at said end an annular chamber 35, which chamber is defined by the inner cylindrical surface of the lower portion of shell 21, which portion constitutes the outer wall of said chamber; by the inturned annular flange 33 at the lower end of shell 21, which flange constitutes the bottom wall of said chamber; and by an inner cylindrical member 36 spaced inwardly of, and concentric with, the lower portion of shell 21, which member constitutes the inner wall of said chamber, said member 36 having at the upper edge thereof an outwardly extending flange 37, the outer edge of which is welded at 38 to the inner surface of shell 21, and which flange constitutes the top wall of said chamber, said member 36 having at the bottom edge thereof an inwardly projecting flange 39, the inner edge of which is welded at 40 to the surface of inner shell 22, flange 39 being in spaced, parallel relation above the inturned flange 33, as clearly indicated in Figs. 5 and 7. The chamber 35 is divided into two circumferentially extending compartments by means of two partitions 41 and 42, which partitions extend downwardly from the top wall 37 of the chamber 35 and terminate at 43. These partitions 41 and 42 are spaced more closely at one side of the device 20 than at the other side thereof, the compartment defined between partition 41 and partition 42 extending for a relatively short distance in a clockwise direction as viewed in Fig. 6, and the other compartment defined by said partitions extending for a relatively great distance in a clockwise direction as viewed in said figure. The top wall 37 immediately above the relatively short circumferentially extending compartment between partitions 41 and 42 is apertured to receive a water supply pipe 44 which extends along the inner surface of shell 21 and passes out of device 20 through an aperture formed in the funnel-like wall 24 at the top of said device, while the top wall 37 immediately above the relatively long circumferentially extending compartment between partitions 41 and 42 is apertured to receive a water discharge pipe 45 which also extends along the inner surface of shell 21 and passes out of the device 20 through an aperture formed in the funnel-like wall 24 in a position diametrically opposite that through which inlet pipe 44 extends.

In order to supply air to the melting zone of the cupola, from the air supply pipes 28 and 29 at the upper end of the device 20, I provide a plurality of radial openings 46 at the lower end of said device, these openings extending completely through the refractory material 32 and through the lower end portion of shell 21 and being in direct communication with air space 23 at the lower end thereof, as clearly illustrated in Figs. 5 and 6, the arrangement being such that air supplied to space 23 is forced through said space, through the plurality of openings 46 and into the melting zone of the cupola within which device 20 is inserted.

As above stated, the device 20 is supported by means of air supply pipes 28 and 29 which in turn are supported in a manner to be hereinafter described, on a wheeled carriage 47, which carriage is capable of being moved over the upper flat surface of an elevated charging platform 48 which surrounds the upper portion of the cupola 1. The carriage 47 includes a top plate 49 of sheet metal or the like provided on its under surface with wheels 50 by means of which said carriage is readily movable along platform 48. One edge of carriage 47 is provided with a semicircular, cutout portion 51 formed on a radius corresponding substantially to the radius of the cupola 1, whereby the said carriage may be moved into close engagement with the outer surface of said cupola with the wall defining the semicircular cutout portion 51 embracing a substantially semicircular portion of the outer wall of said cupola. A suitable, manually operable latch mechanism 52 is provided on the outer surface of the cupola 1 and engages a keeper on the carriage 47 whereby said carriage and the mechanisms supported thereon may be rigidly latched or secured in fixed, operative position with respect to said cupola, or may be detached therefrom and moved along platform 48 to a position remote from said cupola.

A pair of spaced and axially aligned bearing blocks 53 and 54 are mounted on the upper surface of top plate 49 and rotatably journal the opposite ends of a cylindrical, shaft-like member constituting a combined air and water supply member 55 provided with an enlarged, axially extending bore or passage 56 open at one end of said member 55 and communicating adjacent its opposite end with radially disposed air supply pipes 57 and 58 which telescopically engage within the down-turned portions 30 and 31 of pipes 28 and 29, respectively. The end of member 55 at which the bore 56 terminates is provided with a coupling or connector 59 of any desired or preferred construction by which the bore 56 may be detachably connected to a pipe 60, which pipe is, in turn, connected to a source of air under pressure, the arrangement being such that air from said source passes through pipe 60, through bore 56 of member 55, through pipes 57, 58, 28, and 29, into air space 23 of device 20, and is discharged into the cupola through openings 46 at the lower or tip end of device 20, as clearly shown in Fig. 5.

The end of member 55 opposite that through which the bore 56 extends is provided with an axially-extending bore 61 which communicates with a radially-extending bore 62. A water supply pipe 63 having its outer end connected to a source of water under pressure projects into the bore 61 and is maintained in fluid-tight engagement within said bore by means of a stuffing box 64, this pipe being journaled in a bearing block 65 rigidly mounted on the upper surface 49 of carriage 47. A second water supply pipe 66 passes through radial bore 62 and is maintained in fluid-tight engagement within said bore by means of a stuffing box 67. Pipe 66 is telescopically engaged within a down-turned extension 68 of water supply pipe 44, the arrangement being such that water flows through pipe 63 into bore 61, through radially-disposed pipe 66, through extension 68 and pipe 44, into the smaller of the two segmental compartments of the water chamber 35, downwardly through the smaller section of said chamber between the partitions 41 and 42, around and beneath the walls defining the air outlet passages 46, upwardly through the larger of the two segmental sections of water chamber 35, and then upwardly through water discharge pipe 45, the upper end 69 of which is adapted for connection to a hose or pipe through a suitable coupling (not shown) for discharging the cooling water, it being obvious that during the passage of the water through the mechanisms just described, the heat is dissipated from the lower or tip end of device 20, which, with the refractory covering 32, will effectively protect said end from being injured or destroyed by the heat of the melting zone of the cupola in which the device is installed.

As a simple and effective means for raising and lowering the device 20 in the cupola 1 to regulate the position of the lower end of such device with respect to the melting zone within the cupola, I mount on the member 55 through the medium of radially-extending lugs 70 a rectangular framework comprising vertical side members 71 and 72, cross member 73, horizontal side members 74 and 75, rear cross member 76, and rearwardly-inclined brace or strut members 77, the lower ends of which brace or strut members are secured to radially-extending lugs 78 integral with or rigidly attached to the member 55. The framework just described constitutes a rigid structure which, because of the connection of the lower ends thereof to the lugs 70 and 78 on the member 55, is caused to oscillate with the member 55 as said member is oscillated in the bearing blocks 53 and 54. The vertical side members 71 and 72 have mounted thereon horizontally-disposed and aligned bearing blocks 79 and 80 which journal a horizontally-positioned shaft 81 provided at one end thereof with a crank handle 82 by means of which said shaft is rotated. The shaft 81 is provided with a spur gear 83 which is keyed or splined to said shaft to be rotated thereby and is positioned on the shaft at a point approximately midway of the ends thereof so as to be disposed between the air pipe sections 28 and 29 as best shown in Fig. 3. Spur gear 83 meshes with a vertically-disposed rack 84 rigidly connected to air pipe sections 28 and 29 by cross braces 85 and 86 welded or otherwise rigidly attached to said pipe sections. It will be readily apparent that rotation of spur gear 83 through the medium of crank handle 82 and horizontal shaft 81 will cause vertical movement of rack 84, of air supply pipes 28 and 29, and of the combined fuel feeding and air supply device 20 to vary or control the position of the lower or tip end thereof with respect to the level of the melting zone within the cupola. As the mechanism just described is operated, the vertically-disposed sections 30 and 31 of the air supply pipes slide up and down the air pipe sections 57 and 58 with which they are telescopically engaged, and the water supply pipe 68 slides up and down the pipe 66 with which it is telescopically engaged.

In order to move the device 20 from its vertical position shown in full lines in Fig. 1 to a substantially horizontal position outside the cupola as shown in dotted lines in said figure, I key or spline onto the member 55 an operating handle 87 which is oscillatable about the axis of member 55 to oscillate said member and the parts carried by, and supported on, the same from the position shown in full lines in Fig. 1 to the position shown in dotted lines in said figure. As an effective means for maintaining the device 20 in a vertical position or in a substantially horizontal position to which it is moved by oscillation of handle 87, I provide the said handle with a spring-pressed, hand-actuated detent 88, the lower end of which engages with the teeth of a toothed locking segment 89 rigidly secured in upright position and concentrically of the member 55 and on the upper face 49 of carriage 47. This detent enables the handle 87 to be released, and oscillated in a clockwise direction from its full line position as shown in Fig. 1 to a position approximately 90° from said full line position, during which movement the entire device 20 is moved from its normal vertical position within the cupola to a position such as indicated in dotted lines in Fig. 1, after which the spring-pressed, hand-operated detent 88 associated with handle 87 enters between the teeth of the toothed locking segment 89 and retains the device in its substantially horizontal position. When moving the device 20 from its normal vertical position to the dotted line position shown in Fig. 1, it is advisable to raise the said device to its highest position by means of the crank handle 82 before operating the handle 87 so that the lower or tip end of said device will clear the upper edge of the cupola as the device is moved about its axis, i. e. about the axis of the member 55. A suitable slot 90 is cut through the upper face 49 of carriage 47 to accommodate the spur gear 83 and similar openings or slots 91 and 92 are cut through said face, to accommodate the radially-extending lugs 70 when the device 20 and the parts movable therewith, are moved from the vertical to the substantially horizontal position.

It is believed that the operation of the apparatus above described will be readily apparent from the foregoing description of the construction thereof. Suffice it to say that the first step, after repairing the interior of the cupola from wear and corrosion resulting from a previous melting operation, is to start a fire in the lower portion of the cupola and to "bottom charge" the cupola with carbonaceous fuel, metal, ore, or other material to be melted, as is common practice in starting conventional cupola operations, this bed of burning fuel and metal, ore, or the like being built up in the bottom portion of the cupola to a level corresponding substantially to the level to be occupied by the lower end of device 20. The carriage 47 with the device 20 and its associated parts and mechanism, occupying their substantially horizontal positions as shown in dotted lines in Fig. 1, is then rigidly attached to the cupola by means of the manually-operable latch mechanism 52. When secured in this position, the operating handle 87 is latched in a position approximately 90° in a clockwise direction from the full line position shown in Fig. 1 and is maintained in that position by engagement of the detent 88 between the teeth of toothed locking segment 89.

The lid or closure members 14 and 15 having been moved about their pivotal mountings to substantially vertical positions, the operating handle 87 is grasped, the detent 88 released from engagement between the teeth of segment 89, and said handle 87 is moved in a counterclockwise direction through an arc of approximately 90° to the position shown in full lines in Fig. 1, which movement causes the member 55 to oscillate, which oscillation causes the pipe sections 57 and 58 and the pipes 28 and 29 in telescopic engagement therewith to move in a counterclockwise direction as viewed in Fig. 1, from the position shown in dotted lines in Fig. 1 to the position shown in full lines in said figure, thus moving the device 20 to a vertical position within the cupola. The air supply system and the water supply system are then connected and turned on to supply air and water, respectively, through their several passages, to the lower or tip end of the combined fuel and air supply device 20, and the handle 82 is actuated to lower the said device into the cupola so that the lower or tip end thereof is positioned at the proper level with respect to the fire within the cupola.

The cover 26 is then swung about its pivotal mounting to an open position, and carbonaceous fuel such as coke, coal, charcoal, or the like is poured into the space defined by the inner shell 22 until said space is substantially filled with said fuel, whereupon cover 26 is moved to its closed position. The lid or closure members 14 and 15 being raised, metal, ore, or the like material to be melted is introduced through the top of the cupola until the level thereof substantially reaches the top of the cupola, the lid or closure members 14 and 15 then being moved to their substantially horizontal or closed positions with the edges defining semicircular cutout portions 18 and 19 embracing the outer surface of device 20.

The cupola having been started and having been charged with fuel and with the metal, ore, or the like to be melted as above described, the lower air blasts or tuyeres 7 are turned on. The air from said air blasts or tuyeres, together with the air supplied through the openings 46 at the lower or tip end of device 20, effects complete combustion of the carbon monoxide to carbon dioxide which results in the preheating of the metal, ore, or the like in the upper part of the cupola and above the actual melting zone 8, and this preheating continues for the duration of the melting operation. During the melting operation, the gases and products of combustion rise from the lower region of the cupola to the upper region thereof, and are intercepted by the overhanging lip portion 10, pass into annular chamber 11, and are exhausted to the stack by means of the exhaust fan. As the fuel in the shell 22 is consumed, additional fuel is supplied thereto, and as the metal, ore, or like material is melted, additional material is supplied to the top of the cupola 1. It will be obvious that the heat within the cupola is effective to preheat the air which passes downwardly through air supply space 23 within device 20 and discharges through opening 46 into the melting zone of the cupola. During the melting operation, slag and molten material are withdrawn through the respective slag spout and discharge openings in the lower part of the cupola.

As above stated, it is quite important for the satisfactory and efficient operation of the cupola that the device 20 be vertically adjustable so that the lower end of said device may be varied or regulated with respect to the melting zone in accordance with the character and composition of the fuel employed and the character and composition of the metal or other material being melted, and I have provided relatively simple and highly effective means for accomplishing such adjustment. It is also quite important that the lower or tip end of device 20 be protected against the intense heat in and adjacent the melting zone within the cupola, and in the device of the present application, the refractory covering 32 and/or the water cooling chamber 35 at said end, adequately protect said lower end and materially prolong the life of the device as a fuel feeding and air supply device.

When the melting operation has been completed, the device 20 is raised to its uppermost position by operation of handle 82 and is then moved from a vertical position to a substantially horizontal position by actuation of the handle 87. Manually operable latch device 52 is then released and the carriage 47 moved away from the cupola to a convenient location on the upper surface of charging platform 48. The ability to remove the device 20 from the cupola or furnace immediately upon termination of the melting operation is an important function of my present invention.

It is to be understood that the form of my invention shown and described herein is to be taken as a preferred embodiment of the same, and that various changes may be made in the shape, size, and arrangement of parts without departing from the spirit of my invention or from the scope of the subjoined claims.

Having thus described my invention, what I claim is:

1. A combined fuel and air supply device for a vertical type cupola having a melting zone in the lower region thereof and a material preheating zone in the upper region thereof, said device being adapted for mounting within said cupola to accupy a substantial vertical position therein with its upper end extending above the top of the cupola, with its intermediate portion within said material preheating zone and adapted to be surrounded by a portion of the material to be melted within said cupola, and with its lower end below said material preheating zone and adjacent the upper surface of said melting zone, said device including an elongated fuel feeding chamber and an elongated air supply chamber, said chambers being located within said device and having discharge openings at their lower ends adjacent the lower end of said device and through which fuel and air, respectively, may be supplied to the melting zone in the cupola; means for supporting said device within said cupola and including means operatively connected to the upper end of said device for moving said device to and from a vertical position within said cupola from and to a substantially horizontal position outside said cupola; means for supplying fuel and air to the fuel feeding chamber and to the air supply chamber, respectively, of said device; and means at the lower portion and end of said device for protecting said lower portion and end from the heat of the melting zone during operation of the cupola.

2. A combined fuel and air supply device for a vertical type cupola having a melting zone in the lower region thereof and a material preheating zone in the upper region thereof, said device being adapted for mounting within said cupola to occupy a substantially vertical position therein with its upper end extending above the top of the cupola, with its intermediate portion within said material preheating zone and adapted to be surrounded by a portion of the material to be melted within said cupola, and with its lower end below said material preheating zone and adjacent the upper surface of said melting zone said device including an elongated fuel feeding chamber and an elongated air supply chamber, said chambers being located within said device and having discharge openings at their lower ends adjacent the lower end of said device and through which fuel and air, respectively, may be supplied to the melting zone of the cupola; means for supporting said device within said cupola, said supporting means including a horizontally-extending shaft-like member to which the upper end of said device is connected; means for mounting said shaft-like member in position adjacent the upper end of said cupola for oscillation of said shaft-like member about the axis thereof; means operatively connected to said shaft for oscillating said shaft about its axis to move said device from a vertical position within the cupola to a substantially horizontal position outside said cupola; means for supplying fuel and air to said device; and means at the lower portion and lower end of said device for protecting said lower portion and lower end from the heat of the melting zone during operation of the cupola.

3. A combined fuel and air supply device for a cupola as defined in claim 2, wherein the means for supporting said device includes a tubular member communicating with said air supply chamber; wherein said shaft-like member has a bore therein communicating with said tubular member; and wherein the means for supplying air to said device communicates with said bore in said shaft-like member, whereby air passes through said bore, through the tubular member, and through the air supply chamber, to discharge through the air openings adjacent the lower end of said device.

4. A combined fuel and air supply device for a cupola as defined in claim 2 wherein the means for supporting said device includes two members telescopically arranged with respect to each other, the first of said members being rigidly connected to said shaft-like member and the second of said members being connected to said device, said telescopically-arranged members being vertically disposed when said device is in vertical position within the cupola; and wherein means are operatively connected to said second of said members for extending and retracting the same relative to said first member for varying the vertical position of said device within the cupola.

5. A combined fuel feeding and air supply device for a cupola as defined in claim 4, wherein the means operatively connected to said second member includes a vertically disposed rack, a spur gear engaging said rack, and means for rotating said gear to cause said rack and the second member to which it is connected to move vertically with respect to said first member.

6. A combined fuel and air supply device as defined in claim 2 and including a horizontally-disposed charging platform at the upper end portion of the cupola, and a carriage movable over said platform to a position adjacent the upper end portion of said cupola and on which carriage the supporting means for said device is mounted.

7. A combined fuel and air supply device as defined in claim 6 in which the cupola and said carriage are provided with cooperating latch means whereby said carriage and the devices mounted thereon may be detachably connected to the cupola at the upper end portion thereof.

8. A combined fuel and air supply device for a cupola having a melting zone in the lower region thereof, said device being adapted for mounting within said cupola to occupy a substantially vertical position therein and to be surrounded by the material to be melted within said cupola, said device including an elongated fuel feeding chamber and an elongated air supply chamber, said chambers having discharge openings at their lower ends through which fuel and air, respectively, may be supplied to the melting zone of the cupola, said chambers being arranged with the air supply chamber surrounding the fuel supply chamber; a cooling chamber disposed within said air supply chamber at the lower portion thereof; means for supporting said device within said cupola with the lower end thereof adjacent the upper surface of the melting zone in said cupola, said supporting means including a horizontally-extending shaft-like member to which the upper end of said device is connected, said shaft-like member having a bore therein communicating with a source of cooling fluid under pressure; means for mounting said shaft-like member in position adjacent the upper end of said cupola for oscillation of said shaft-like member about its axis; means operatively connected to said shaft-like member for oscillating said device about the axis of the shaft-like member to move said device from a vertical position within the cupola to a substantially horizontal position outside said cupola; means for supplying fuel and air to said device; and a tubular connection between the bore within said shaft-like member and the cooling chamber for supplying cooling fluid from said bore to said cooling chamber.

9. A combined fuel and air supply device for a cupola as defined in claim 8, wherein said tubular connection extends upwardly from the cooling chamber and is connected at its upper end to the bore within the shaft-like member, and wherein a second tubular connection extends upwardly from the cooling chamber and is connected at its upper end to a discharge connection.

References Cited in the file of this patent

UNITED STATES PATENTS

| 974,322 | Wells | Nov. 1, 1910 |
| 1,015,296 | Chapman | Jan. 23, 1912 |
| 2,201,738 | Neve | May 21, 1940 |

FOREIGN PATENTS

| 3,806 | Great Britain | Mar. 12, 1888 |
| 177,590 | Great Britain | Mar. 23, 1922 |
| 139,540 | Austria | Nov. 26, 1934 |
| 182,328 | Switzerland | Feb. 15, 1936 |